July 28, 1925.
L. S. ABBOTT
ROCESS OF IMPROVING OIL
Filed Sept. 20, 1920
1,547,191
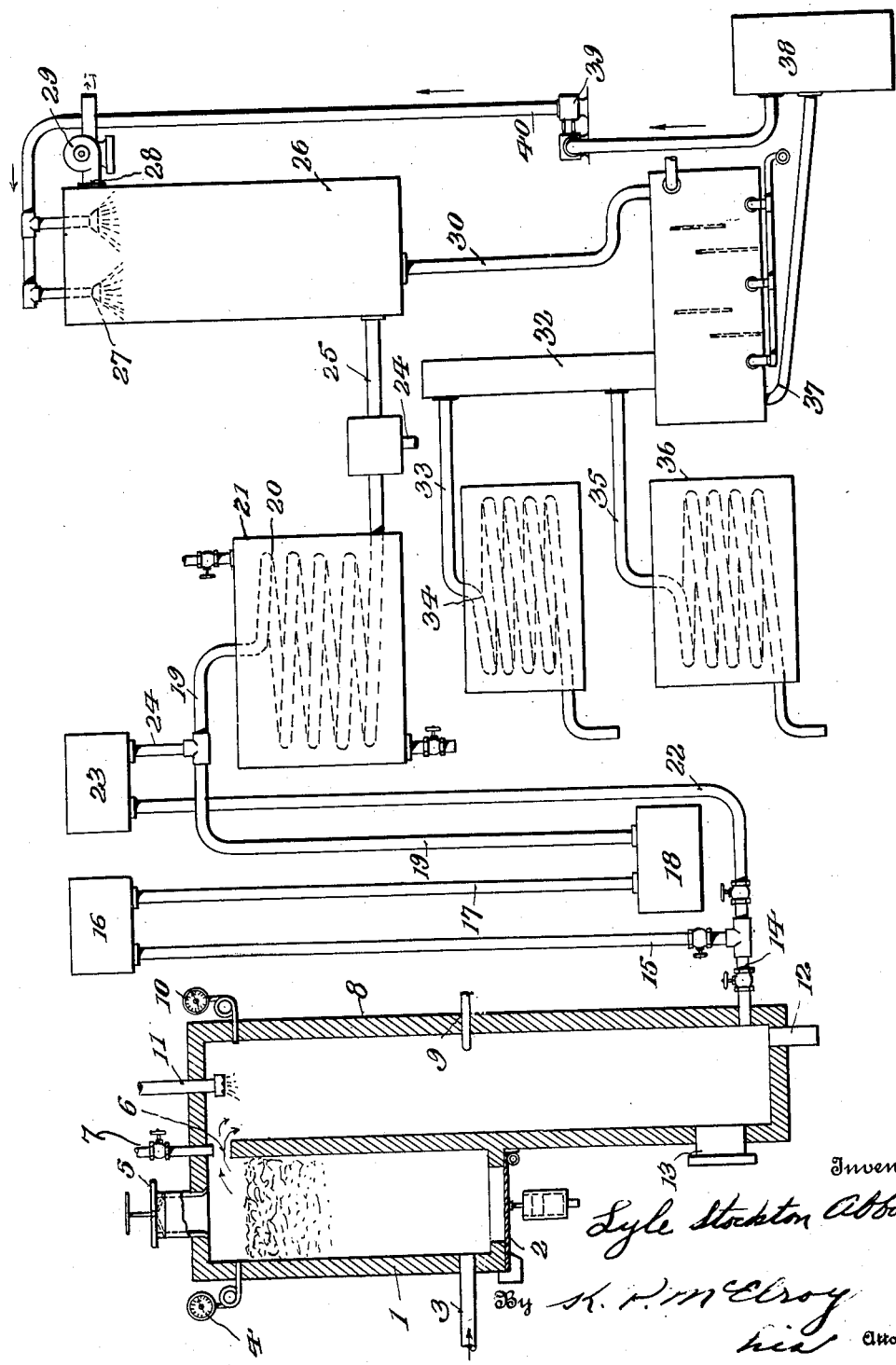

Patented July 28, 1925.

1,547,191

UNITED STATES PATENT OFFICE.

LYLE STOCKTON ABBOTT, OF RIVER EDGE, NEW JERSEY, ASSIGNOR TO GULF REFINING COMPANY, OF PITTSBURGH, PENNSYLVANIA, A CORPORATION OF TEXAS.

PROCESS OF IMPROVING OIL.

Application filed September 20, 1920. Serial No. 411,641.

*To all whom it may concern:*

Be it known that I, LYLE STOCKTON ABBOTT, a citizen of the United States, residing at River Edge, in the county of Bergen and State of New Jersey, have invented certain new and useful Improvements in Processes of Improving Oil, of which the following is a specification.

This invention relates to processes of improving oil; and it comprises a method of producing oily materials suitable for further manufacture and the production of various commercial products wherein low grade oily materials of various kinds, such as the low grade crude oils, tarry residues of cracking distillation, tars, etc., are sprayed into a body of superheated, indifferent gases of the type of producer gas at a temperature high enough to effect a cracking and in sufficient volume to afford the necessary heat units and give a rather dilute mixture with the oil vapors produced, the indifferent gas being advantageously formed in a gas producer of an ordinary type, and the oily bodies formed are recovered by submitting the hot dilute mixture of oil vapors and gas to a cooling and to a scrubbing with a high boiling oil, the oil used in scrubbing being afterward submitted to a distillatory treatment to distil off vapors of absorbed oil, to recover such oil and to fit the scrubbing oil for further use; all as more fully hereinafter set forth and as claimed.

It is a well known practice in the oil refining art to produce gasoline and the like by destructively distilling various petroleum oils and materials, as, for instance, gas oil, at high temperatures, the operation being usually known as cracking. Cracking is performed in many ways, the cracking being sometimes effected with the oil in the vapor condition and sometimes with the liquid oil. Sometimes pressure is used and sometimes not. Whatever the process employed, there is a production of vapors of low boiling bodies (gasoline) and a residuum of cracked, more or less tarry character. For this residue, in the event that the cracking has been extensive, there is very little use. It is very low grade material and chiefly valuable as fuel. There are many other low grade oily products in oil refineries of little commercial value, since they cannot be made to produce commercially valuable materials by ordinary distillation and other refinery processes. Some natural crude oils are also of extremely low grade and value.

It is a purpose of the present invention to provide a method of, and apparatus for, cracking to produce oils, such as gasoline, of a petroleum character; a method suitable for converting these low grade oily materials into materials of a high grade which are susceptible of treatment by the ordinary distilling methods to produce commercial products. To this end, I first heat a body of indifferent gases of the type of producer gas to a high temperature; a temperature such as to give the gas sufficient sensible heat to produce an averaged temperature somewhat above 600° F. when a given quantity of gas is mingled with a given quantity of sprayed oil. These gases are not oxidizing in their character. Into this hot gas I spray the oil to be treated. The producer gas is substantially a mixture of CO and nitrogen with some $CO_2$. I employ the gases at a temperature of at least 600° F. and advantageously considerably above this temperature, say, at 1000° to 1200° F. The higher the temperature of the gases, the greater is the amount of oil which can be sprayed in without lowering the averaged temperature below that at which cracking will take place; or, in other words, the hotter the gases the greater is the amount of oil which can be sprayed in. On spraying such an amount of oil into a hot body or current of gases in such quantity that the averaged temperature will be somewhere above 600° F., cracking and other chemical changes of the oil, attended with deposition of more or less carbon, occur. Deposition of carbon is incident to any cracking process and in the ordinary ways of cracking oils and their vapors in stills, retorts and the like, this often is an annoying detail, since the carbon deposits on the hot walls as coke, impeding the transmission of heat. In any ordinary distillation or retort process, of course, the walls are hotter than the material under treatment and it is on the walls that deposition of carbon occurs. In the present invention, on the other hand, the temperature of the mixture undergoing reaction is ordinarily higher than that of the chamber walls enclosing it and there is no tendency toward the deposition of carbon on the walls; neither would it be in any way injurious did it occur. As a matter of fact, such carbon as is formed occurs in the form of a light lampblack or soot which mostly goes forward with the gases and vapors emerging from the reaction chamber. There is ordinarily in the present process the production of a substantial amount of asphalt and this is removed as a merchantable product. The amount of gas present should be such as will easily carry the vapors of oil produced without much condensation on cooling; even where the cooling is to a relatively low temperature. After having produced as much cracking action on the oil as I desire, I next cool the mixed body of gases and vapors. Ordinary air cooling does not usually produce much, if any, condensate of oil, but on cooling and slowing down the speed of the gas and vapor current there is a deposition of lampblack which may be recovered and utilized. On further cooling with the aid of ordinary water cooled condensers, there is a production of a substantial quantity of high boiling oils susceptible of redistillation in the ordinary ways to produce good qualities of lubricating oils, burning oils, etc. Contained in this condensate of heavy oils there may be a certain amount of light oils in solution; and these light oils may be recovered by distillatory treatment of the heavy or high boiling oils. Much of the produced oily products of light character, however, because of the presence of the diluting gases, resists condensation by simple cooling and to recover this portion of the product, it is necessary to scrub the mixture of gases and vapors with a good absorbent for oils. For this purpose a high boiling lubricating oil does very well. The scrubbed waste gases may be used for any purpose for which they are applicable. Where producer gas is used as the carrier, it may of course be burnt or otherwise disposed of. It is of course possible to reheat the scrubbed gas and return it for use anew in cyclic manner but in the embodiment of my invention which I regard at present as most advantageous, I do not do this, preferring to use the gases but once. This is for the reason that the reheating of scrubbed cold gases is ordinarily more complicated and less economical than the production of a new body of very hot gases; this being particularly the case where hot producer gas is used as a carrier of heat.

In the described process most of the low grade oily material treated is recovered in useful forms as asphalt, lampblack, high boiling oils given by direct condensation and low boiling oils recovered by the scrubbing operation. There is a very little production of fixed gases at the expense of the oil. The hot gases used in the operation as a carrier of heat do not react chemically to any substantial extent with the oil vapors.

In the embodiment of my invention which I regard at present as the most advantageous, I pass air through an ordinary type of gas producer in the ordinary way to make an issuing current or body of very hot indifferent gases, (producer gas). The air may be passed through at such a rate as to make mainly producer gas, that is a mixture of $CO$ and nitrogen with some $CO_2$; or an accelerated blast may be used, in the ordinary manner common in blowing up water gas generators, with the result of producing a much hotter body of gases containing large amounts of $CO_2$ and nitrogen. Or the gas producer may be run to make producer gas and then some additional air supplied to burn this gas prior to its entry into the cracking apparatus and produce very hot products of combustion for use therein. The hot gas, whatever its character, is led through a conduit and into it is sprayed a certain amount of the low grade oil which is to be improved. The feed of oil is ordinarily adjusted in correspondence with the temperature of the gas mass used, so that after the mixture the average temperature will be at least sufficient for cracking. An average temperature after the admixture of about 1100° F. is a desirable one as giving a quick and complete action. As the averaged temperature of the mixture of course depends upon the amount of oil sprayed in, a convenient method of control is afforded by regulating the inflow of sprayed oil by means of a thermostatic arrangement thereby securing uniform temperature of the admixture. I conduct this part of the operation, that is the mixture of the preheated gases with sprayed oil, in a tolerably roomy reaction chamber kept at definite temperature. In this reaction chamber a certain amount of asphalt collects and is drawn off from time to time. The body of gases and vapors coming from the reaction chamber is next led through an air cooled conduit to lower its temperature. In this air cooled conduit there is usually no separation of oil and it is rare to have any substantial separation. Much of the lampblack or soot formed in the reaction however deposits out at this time. The mixture of vapors and gases is next led through a water cooled condenser of any ordinary type with the result of producing a certain amount of condensate of a high boiling character, that is, heavy oils. The condensate so produced is recovered. It may be here called the No. 1 condensate. After this cooling and condensation, the body of gases and vapors still contains much valuable oil in vapor form and it is practically impossible to condense and remove it by simple cooling. For this reason I submit the cooled mixture to a scrubbing with any convenient high boiling solvent for oils.

It is best to effect the scrubbing by atomizing the high boiling scrubbing oil used into an ascending current of the mixture of gases and vapors. The gases passing the scrubber are, or may be, substantially free of oils and may be led to any point of use or discharged to waste, as their character may indicate. The oil used for scrubbing, which may be called wash oil, after its contact with the gases is removed and distilled in any ordinary still to produce what may be called the No. 2 condensate. After being distilled and stripped of absorbed oil, it may be sent back for reuse in scrubbing.

In the distillation of the charged wash oil, any convenient type of still, such as a steam still, steam heated stills, etc., may be used. In practice it is convenient to keep the wash oil flowing in cyclic manner through a scrubbing device in contact with the gases to be stripped and a distilling device to recover the oils so taken up. The No. 2 condensate formed by distilling the charged wash oil is susceptible of use for the production of motor spirit, kerosene, solar oil, gas oil, etc.

In the described manner of operation, low grade materials which by ordinary distillation would not give anything of substantial value are converted into improved oily materials readily amenable to ordinary distillation methods with the production of oily products of good commercial grade.

In the accompanying illustration I have shown, more or less diagrammatically, an organization of apparatus elements adapted for use in the operation of the present process. In this illustration the view is in elevation, certain parts being shown in vertical section. In the showing, Element 1 is a gas producer of ordinary type, shown as provided with dumping bottom 2, blast inlet 3, pressure gage 4 and fuel inlet 5. Producer gas is led off through outlet 6. Secondary air inlet 7 may be provided for the purpose of burning producer gas, when this is formed in the producer, and giving a highly heated body of products of complete combustion. Adjacent this producer and, as shown, having one wall common therewith, is a reaction chamber 8, shown as a vertical conduit or tower provided with pyrometer 9 and pressure gage 10. Into the top of this column passes an atomizing or oil spraying device 11, supplied with the oily or tarry material to be treated. At the base of the reaction tower or chamber is outlet 12 for removing asphalt formed in the action. The manhole 13 is provided for cleaning out. From the base of the reaction tower the mixture of gases and vapors passes through conduit 14 to an air-cooling device. As shown the mixture may be sent in either of two alternative ways. It may be taken by valved conduit 15 to header 16 and thence through 17 to a carbon collecting chamber 18, going thence through 19 to cooling coil 20 in tank or tub 21. Or it may be passed directly through valved conduit 22 to carbon collecting chamber 23 and thence through 24$^a$ to the cooling coil. A certain amount of condensate is formed in this cooler and is removed at 24. Which of these alternative ways is used depends upon the character of the waste oil treated. Uncondensed vapors and gases pass through 25 into diagrammatically shown scrubber 26 where they travel upwardly against downpassing sprayed wash oil from nozzles 27. Uncondensed gases are withdrawn from the scrubbing tower at 28 by exhauster 29 and are sent to a suitable place of disposition. This exhauster may be made to produce suction throughout the whole line. Advantageously the pressure at no point exceeds atmospheric pressure. The exhauster may even be so run as to cause the producer shown to act as a suction producer. The wash oil coming from the bottom of the scrubber at 30 passes into one end of a still 31 and, traveling therethrough, is stripped of its absorbed oils. As shown, this still is of an ordinary type provided with tower 32 having an outlet 33 at a high point leading to a condenser 34 and another outlet 35 at a lower point leading to another condenser 36. By this arrangement, the oils stripped from the wash oil may be recovered in the form of different cuts, thereby saving somewhat in distillation. However, it is possible to use an ordinary steam still or a fire heated still for the stripping still. The stripped oil leaves the steam still through 37, goes to storage tank 38, whence it may be taken by pump 39 and line pipe 40 back to the spray nozzles for use again.

In applying the described process to a reduced Mexican crude oil of about 15° Baumé, I recovered about 15 per cent of asphalt of a good grade at the base of reaction tower 8. This asphalt contained 15.8 per cent of fixed carbon and the asphaltic matter was completely soluble in carbon bisulfid. Its specific gravity was 1.1041. The temperature in the reaction zone was maintained at 1100° F. by adjusting the feed of oil to the temperature of the hot gases coming from producer 1. From the water cooled condenser 20 I recovered at 24 about 35 per cent of No. 1 condensate of 22.7° Baumé and an overpoint of 442° F. On redistillation this gave me various high boiling products, including good grades of lubricating oil. On reducing with steam, I recovered 18.2 per cent (calculated to the original oil) of lubricating oil of 304° viscosity at 100° and 20.6° Baumé. With the aid of the scrubber and the still, I recovered 47 per cent of No. 2 condensate, this including 16.5 per cent of oil suitable for motor spirit. As will be seen, the loss in carbon and gas was very small.

Cracked residues from ordinary gasoline cracking operations submitted to the present process gave proportionally good results, yielding a certain amount of asphaltic oil, of high boiling condensate and of lighter oils recovered by scrubbing.

In using producer gas in the present invention the gas is not in any way deteriorated, it being in fact somewhat improved as regards fuel value; the improvement being to the extent that it is joined by combustible gas arising from the cracking of the oil. While the amount of this gas is, as stated, not great, most of the oil being converted into other products, it takes but little of such an increment to raise the fuel value of producer gas noticeably. I make producer gas, use some of its sensible heat for cracking purposes and then recover the gas, somewhat improved, for its ordinary purposes.

What I claim is:

1. The process of improving low grade petroleum oils with the aid of producer gas and with the production of cracked oils, asphalt and improved producer gas, which comprises spraying such a low grade oil into a hot current of producer gas at such a temperature as will suffice to raise the oil and gas to a cracking temperature suitable for the production of gasoline, withdrawing the asphalt formed, cooling the mixture of gases and vapors, removing whatever condensate forms, scrubbing the residual gases and vapors with a high boiling oil and separately collecting the improved gases and the high boiling oil charged with absorbed oils.

2. The process of improving low grade petroleum oils by cracking which comprises spraying such an oil into a hot current of producer gas at such a temperature as will suffice to raise the oil and gas to a cracking temperature suitable for the production of gasoline, cooling the mixture, removing whatever condensate forms and scrubbing the residual gases and vapors with a high-boiling oil.

3. The process of improving low grade petroleum oils by cracking which comprises spraying such an oil into a hot current of indifferent gases of the nature of producer gas in amounts so correlated to the temperature of the gases that the mixture will have a temperature around 1100° F., cooling the mixture, removing whatever condensate forms and scrubbing the residual gases and vapors with a high-boiling oil.

In testimony whereof, I have hereunto affixed my signature.

LYLE STOCKTON ABBOTT.